United States Patent
Sato et al.

(10) Patent No.: US 9,485,023 B2
(45) Date of Patent: Nov. 1, 2016

(54) COMMUNICATION SYSTEM, MAIN UNIT, RADIO ACCESS UNIT AND COMMUNICATION METHOD

(71) Applicant: Nokia Solutions and Networks Oy, Espoo (FI)

(72) Inventors: Takaaski Sato, Kanagawa (JP); Fumitoshi Goto, Kanagawa (JP); Masafumi Shiohara, Kanagawa (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/699,080

(22) Filed: Apr. 29, 2015

(65) Prior Publication Data

US 2015/0236786 A1  Aug. 20, 2015

Related U.S. Application Data

(63) Continuation of application No. 13/582,974, filed as application No. PCT/JP2011/002169 on Apr. 12, 2011, now abandoned.

(30) Foreign Application Priority Data

Apr. 16, 2010  (JP) .................. 2010-095184

(51) Int. Cl.
*H04B 10/00* (2013.01)
*H04B 10/2575* (2013.01)
*H04J 14/02* (2006.01)
*H04L 5/00* (2006.01)

(52) U.S. Cl.
CPC ......... *H04B 10/25752* (2013.01); *H04J 14/02* (2013.01); *H04L 5/003* (2013.01)

(58) Field of Classification Search
USPC .................................. 398/115–118
See application file for complete search history.

(56) References Cited

U.S. PATENT DOCUMENTS

| | | | | |
|---|---|---|---|---|
| 4,183,054 A | * | 1/1980 | Patisaul | H04N 7/22 348/E7.049 |
| 5,067,173 A | * | 11/1991 | Gordon | H04L 1/06 379/56.1 |
| 5,452,471 A | * | 9/1995 | Leopold | H04B 7/18563 455/12.1 |
| 5,613,209 A | * | 3/1997 | Peterson | H04W 84/08 455/518 |
| 5,621,786 A | | 4/1997 | Fischer et al. | |
| 5,627,879 A | * | 5/1997 | Russell | H04W 88/085 370/328 |
| 5,642,405 A | | 6/1997 | Fischer et al. | |
| 5,644,622 A | | 7/1997 | Russell et al. | |
| 5,657,374 A | * | 8/1997 | Russell | H04W 88/085 370/328 |
| 5,661,723 A | * | 8/1997 | Ueno | H04L 49/105 370/315 |
| 5,852,651 A | | 12/1998 | Fischer et al. | |

(Continued)

FOREIGN PATENT DOCUMENTS

JP   2003-147862 A   5/2003

*Primary Examiner* — Agustin Bello
(74) *Attorney, Agent, or Firm* — Harrington & Smith

(57) ABSTRACT

A plurality of radio access units form the single cell of a first communication system, while forming respective individual multi-cells of a second communication system within the single cell. The plurality of radio access units transmit a downstream signal of the first communication system input from a main unit to a terminal using the first communication system of the single cell, while each transmitting a downstream signal of the second communication input from the main unit to a terminal using the communication system of the corresponding respective one of the multi-cells.

11 Claims, 8 Drawing Sheets

(56) References Cited

U.S. PATENT DOCUMENTS

| | | | | |
|---|---|---|---|---|
| 6,049,593 A * | 4/2000 | Acampora | H04B 10/11 | 379/56.2 |
| 6,128,496 A * | 10/2000 | Scheinert | H04B 7/2609 | 455/15 |
| 6,314,163 B1 * | 11/2001 | Acampora | H04B 10/11 | 379/56.2 |
| 6,674,966 B1 * | 1/2004 | Koonen | H04B 10/25752 | 370/318 |
| 6,950,678 B1 * | 9/2005 | Mujtaba | H04W 16/32 | 342/368 |
| 7,072,586 B2 * | 7/2006 | Aburakawa | H04B 10/25753 | 398/115 |
| RE40,564 E * | 11/2008 | Fischer | H04W 88/085 | 398/115 |
| 7,565,170 B2 * | 7/2009 | Buscaglia | H04B 1/126 | 375/346 |
| 7,796,554 B2 | 9/2010 | Liu et al. | | |
| 7,844,273 B2 * | 11/2010 | Scheinert | H04W 84/047 | 455/444 |
| 8,270,987 B2 * | 9/2012 | Boldi | H04W 88/085 | 398/115 |
| 8,346,091 B2 * | 1/2013 | Kummetz | H04W 88/085 | 370/276 |
| RE43,964 E * | 2/2013 | Fischer | H04W 88/085 | 379/56.2 |
| 8,422,885 B2 * | 4/2013 | Adhikari | H04W 88/085 | 370/329 |
| 8,532,490 B2 * | 9/2013 | Smith | H04B 10/25754 | 398/115 |
| 8,548,419 B1 * | 10/2013 | Sennett | H04W 4/22 | 455/404.1 |
| 8,634,799 B1 * | 1/2014 | Economy | H04W 48/18 | 455/404.1 |
| 8,792,933 B2 * | 7/2014 | Chen | H04B 7/022 | 370/254 |
| 9,219,879 B2 * | 12/2015 | George | H04B 10/25754 | |
| 2002/0048071 A1 * | 4/2002 | Suzuki | H04B 10/25755 | 398/141 |
| 2002/0167954 A1 * | 11/2002 | Highsmith | H04L 12/2856 | 370/406 |
| 2002/0171897 A1 * | 11/2002 | Cho | H04B 10/1125 | 398/121 |
| 2002/0191565 A1 * | 12/2002 | Mani | H04B 10/25755 | 370/334 |
| 2003/0032424 A1 * | 2/2003 | Judd | H01Q 1/246 | 455/426.1 |
| 2004/0242240 A1 * | 12/2004 | Lin | H04W 8/245 | 455/456.3 |
| 2005/0123301 A1 * | 6/2005 | Kallstenius | H04B 10/1125 | 398/115 |
| 2005/0157675 A1 * | 7/2005 | Feder | H04W 4/04 | 370/328 |
| 2007/0292136 A1 * | 12/2007 | Sauer | H01Q 9/285 | 398/115 |
| 2008/0188221 A1 * | 8/2008 | Hashimoto | H04W 48/02 | 455/435.1 |
| 2008/0240036 A1 * | 10/2008 | Liu | H04W 28/08 | 370/331 |
| 2008/0293446 A1 * | 11/2008 | Rofougaran | H01L 23/49855 | 455/552.1 |
| 2009/0054029 A1 * | 2/2009 | Hogberg | H04L 41/5006 | 455/404.2 |
| 2009/0061939 A1 * | 3/2009 | Andersson | H04B 7/0874 | 455/562.1 |
| 2009/0135966 A1 * | 5/2009 | Fischer | H04L 69/04 | 375/341 |
| 2009/0197540 A1 * | 8/2009 | Wild | H04L 1/20 | 455/67.14 |
| 2010/0034299 A1 * | 2/2010 | Love | H04L 5/0048 | 375/260 |
| 2010/0054200 A1 * | 3/2010 | Tsai | H04B 7/0408 | 370/329 |
| 2010/0260121 A1 * | 10/2010 | Gholmieh | H04L 27/0006 | 370/329 |
| 2010/0296816 A1 * | 11/2010 | Larsen | H04B 10/25754 | 398/116 |
| 2010/0317357 A1 | 12/2010 | Miki et al. | | |
| 2011/0143649 A1 * | 6/2011 | Sabat, Jr. | H04W 92/045 | 455/3.01 |
| 2011/0200325 A1 * | 8/2011 | Kobyakov | H04B 10/25753 | 398/25 |
| 2011/0222434 A1 * | 9/2011 | Chen | H04B 7/022 | 370/254 |
| 2011/0244887 A1 * | 10/2011 | Dupray | G01C 21/206 | 455/456.2 |
| 2012/0027145 A1 * | 2/2012 | Uyehara | H04J 3/0685 | 375/356 |
| 2012/0121270 A1 * | 5/2012 | Logan | H04B 10/25754 | 398/116 |
| 2012/0134666 A1 * | 5/2012 | Casterline | H04B 10/25754 | 398/22 |
| 2012/0163179 A1 * | 6/2012 | Jo | H04B 7/15507 | 370/237 |
| 2012/0163829 A1 * | 6/2012 | Cox | H04B 10/808 | 398/115 |
| 2012/0195329 A1 * | 8/2012 | Thelen | H04B 10/25752 | 370/480 |
| 2012/0309349 A1 * | 12/2012 | Schmidt | H04W 88/085 | 455/410 |
| 2012/0321305 A1 * | 12/2012 | George | H04B 10/25754 | 398/45 |
| 2013/0004176 A1 * | 1/2013 | Sato | H04B 10/25754 | 398/96 |
| 2013/0012195 A1 * | 1/2013 | Sabat, Jr. | H04W 16/14 | 455/426.1 |
| 2013/0028606 A1 * | 1/2013 | Baker | G01S 5/0226 | 398/116 |
| 2013/0121703 A1 * | 5/2013 | Kummetz | H04W 88/085 | 398/115 |
| 2013/0272696 A1 * | 10/2013 | Palanisamy | H04B 10/25754 | 398/25 |
| 2015/0236786 A1 * | 8/2015 | Sato | H04B 10/25752 | 398/79 |
| 2015/0349892 A1 * | 12/2015 | Fischer | H04B 10/25759 | 398/66 |
| 2016/0029162 A1 * | 1/2016 | Edge | H04W 4/06 | 455/456.1 |

* cited by examiner

US 9,485,023 B2

COMMUNICATION SYSTEM, MAIN UNIT, RADIO ACCESS UNIT AND COMMUNICATION METHOD

CROSS-REFERENCE TO RELATED APPLICATIONS

This application is a continuation of U.S. patent Ser. No. 13/582,974, filed on Sep. 5, 2012, which claims the benefit of PCT/JP20111002169, filed on Apr. 12, 2011, which further claims the benefit of Japanese application 2010-095184, filed on Apr. 16, 2010, the disclosures of which are hereby incorporated by reference in their entirety to provide continuity of disclosure.

TECHNICAL FIELD

The present invention relates to a communication system, a main unit, a radio access unit and a communication method. More particularly, the present invention relates to a communication system, a main unit, a radio access unit and a communication method for making space where any radio wave signal from a radio base station installed outdoors can not be received, for example, in buildings or underground malls, usable as a coverage area.

BACKGROUND ART

A communication system shown in FIG. 1 is known as a conventional communication system. FIG. 1 is a diagram showing conventional communication system 1. Communication system 1 in FIG. 1 is mainly formed of radio base station apparatus 2, main unit 3, and a plurality of handsets 4. A plurality of handset 4 define single cell #10.

In communication system 1 in FIG. 1, radio base station apparatus 2 transmits a downlink signal to main unit 3 and main unit 3 splits the downlink signal and distributes the downlink signals to a plurality of handsets 4. Each handset 4 then transmits the distributed downlink signal to a terminal (not shown) in single cell #10 by radio. A plurality of handsets 4 each receive an uplink signal which is a radio signal transmitted from a terminal (not shown) in single cell #10 and transmit the received uplink signal to main unit 3. Main unit 3 then transmits the received uplink signals to radio base station apparatus 2. Accordingly, conventional communication system 1 can secure a wide coverage in proportion to the number of handsets since a plurality of handsets 4 define single cell #10.

The need for improving a user throughput in packet data communication has been increasing in recent years in addition to the need for securing a wide coverage. A communication system defining only a single cell shown in FIG. 1 finds it difficult to meet this need. For example, a problem arises in a situation where a user performing communication involving a high occupancy rate of a radio band shared by a plurality of users exists in a single cell. In this situation, the throughputs of users communicating in the same single cell as the single cell used by the user are lowered.

The system configuration shown in Patent Literature 1, which uses different communication systems in combination, may be employed as a communication system to solve the problem. According to Patent Literature 1, the system configuration allows the user's in the different communication systems to coexist, thereby solving the above problem.

CITATION LIST

Patent Literature

PTL 1
Japanese Patent Application Laid-Open No. 2002-252867

SUMMARY OF INVENTION

Technical Problem

In Patent Literature 1, however, equipment for modulating and demodulating all the different communication systems is installed in a base unit which is the main unit. Accordingly, the system disclosed in Patent Literature 1 has a problem of requiring a significant change in an existing system configuration and not being able to flexibly respond to a change in a system such as a change in the number of cells after the start of operation.

It is therefore an object of the present invention to provide a communication system, a main unit, a radio access unit and a communication method that can flexibly respond to a change in a system without necessity of significant change in an existing system configuration, thereby making it possible to reduce costs entailed in introduction of the system, secure a wide coverage, and improve a user throughput.

Solution to Problem

A communication system of the present invention is a communication system including a radio base station apparatus, a main unit connected to the radio base station apparatus and a network, and a plurality of radio access units connected to the main unit, and employs a configuration in which the radio base station apparatus is configured to output a downlink signal of a first communication system to the main unit; the main unit is configured to output the downlink signal of the first communication system received from the radio base station apparatus and a downlink signal of a second communication system received from the network to each of the plurality of radio access units; and the plurality of radio access units are configured to define a single cell of the first communication system; each of the plurality of radio access units is configured to define a multiple cell of the second communication, system in the single cell, to transmit the downlink signal of the first communication system received from the main unit to a terminal that uses the first communication system in the single cell, to performs wired protocol signal processing and then wireless, protocol signal processing on the downlink signal of the second communication system received from the main unit to generate a resultant signal, and to transmit the resultant signal to a terminal that uses the second communication system in the multiple cell.

A communication system of the present invention is a communication system including a radio base station apparatus, a main unit connected to the radio base station apparatus and a network, and a plurality of radio access units connected to the main unit, and employs a configuration in which the plurality of radio access units are further configured to define a single cell of a first communication system; each of the plurality of radio access units is further configured to define a multiple cell of a second communication system in the single cell, to output an uplink signal of the first communication system received from a terminal that uses the first communication system in the single cell to the main unit, to perform wireless protocol signal processing and then wired protocol signal processing on an uplink signal of the second communication system received from a terminal that uses the second communication system in the multiple cell to generate a signal, and to output the signal to the main unit; the main unit is further configured to synthesize the uplink signals of the first communication system received from the plurality of radio access units, to output the synthesized signal to the radio base station apparatus, and to output the uplink signals of the second communication system received from the plurality of radio access units to the network; and the radio base station apparatus configured to acquire the synthesized uplink signal of the first communication system from the main unit.

A main unit according to the present invention employs a configuration to include a splitting section configured to split a received downlink signal of a first communication system into a plurality of downlink signals of the first communication system; and a multiplexing section configured to multiplex each of the downlink signals of the first communication system split in the splitting section with a received downlink signal of a second communication system into a first multiplexed signal, and to output the first multiplexed signal.

A main unit according to the present invention employs a configuration to include a demultiplexing section configured to acquire a plurality of first multiplexed signals in each of which an uplink signal of a first communication system and an uplink signal of a second communication system are multiplexed, to demultiplex each of the acquired first multiplexed signals into the uplink signal of the first communication system and the uplink signal of the second communication system, and to output the demultiplexed uplink signal of the second communication system; and a synthesis section configured to synthesize the uplink signals of the first communication system demultiplexed in the demultiplexing section, and to output the synthesized signal.

A radio access unit according to the present invention employs a configuration to include an acquiring section configured to acquire a downlink signal of a first communication system and a downlink signal of a second communication system; a protocol processing section configured to perform wired protocol signal processing and then wireless protocol signal processing on the downlink signal of the second communication system acquired in the acquiring section; and a transmitting section configured to transmit the downlink signal of the first communication system acquired in the acquiring section to a terminal that uses the first communication system in a single cell of the first communication system, the single cell being defined by the radio access unit and the other radio access units, and to transmit the downlink signal of the second communication system which is subjected to the wireless protocol signal processing in the protocol processing section, to a terminal that uses the second communication system in a multiple cell of the second communication system, the multiple cell being defined in the single cell.

A radio access unit according to the present invention employs a configuration to include a receiving section configured to receive an uplink signal of a first communication system from a terminal that uses the first communication system in a single cell of the first communication system, the single cell being defined by the radio access unit and the other radio access units, and to receive an uplink signal of a second communication system from a terminal that uses the second communication system in a multiple cell of the second communication system, the multiple cell being defined in the single cell; a protocol processing section configured to perform wireless protocol signal processing and then wired protocol signal processing on the uplink signal of the second communication system received in the receiving section; and an outputting section configured to output the uplink signal of the first communication system received in the receiving section and the uplink signal of the second communication system which is subjected to the wired protocol signal processing in the protocol processing section.

A communication method according to the present invention is a communication method in a communication system including a radio base station apparatus, a main unit connected to the radio base station apparatus and a network, and a plurality of radio access units connected to the main unit, and employs a configuration to include the steps of: outputting, from the radio base station apparatus, a downlink signal of a first communication system to the main unit; outputting, from the main unit, the downlink signal of the first communication system received from the radio base station apparatus and a downlink signal of a second communication system received from the network to each of the plurality of radio access units; defining a single cell of the first communication system by the plurality of radio access units, each of the plurality of radio access units defining a multiple cell of the second communication system in the single cell; transmitting, from each of the radio access units, the downlink signal of the first communication system received from the main unit to a terminal that uses the first communication system in the single cell; performing, by each of the radio access units, wired protocol signal processing and then wireless protocol signal processing on the downlink signal of the second communication system received from the main unit, to generate a signal; and transmitting, from each of the radio access units, the signal, to a terminal that uses the second communication system in the multiple cell.

A communication method according to the present invention is a communication method in a communication system including a radio base station apparatus, a main unit connected to the radio base station apparatus and a network, and a plurality of radio access units connected to the main unit, and employs a configuration to include the steps of: defining a single cell of a first communication system by the plurality of radio access units, each of the plurality of radio access units defining a multiple cell of a second communication system in the single cell: outputting, from each of the radio access units, an uplink signal of the first communication system received from a terminal that uses the first communication system in the single cell to the main unit; performing, by each of the radio access units, wired protocol signal processing and then wireless protocol signal processing on an uplink signal of the second communication system received from a terminal that uses the second communication system in the multiple cell, to generate a signal; outputting, from each of the radio access units, the signal to the main unit; synsethizing, by the main unit, the uplink signals of the first communication system received from the plurality of radio access units, outputting, from the main unit, the synthesized signal to the radio base station apparatus, outputting, from the main unit, the uplink signals of the second communication system received from the plurality of radio access units to the network; and acquiring the synthesized uplink signal of the first communication system from the main unit by the radio base station apparatus.

Advantageous Effects of Invention

According to the present invention, it is possible to flexibly respond to a change in a system without necessity of significant change in an existing system configuration, thereby making it possible to reduce costs entailed in introduction of the system, secure a wide coverage, and improve a user throughput.

DESCRIPTION OF EMBODIMENTS

Embodiments of the present invention will be described in detail with reference to the accompanying drawings.

Embodiment 1

Figure 1:
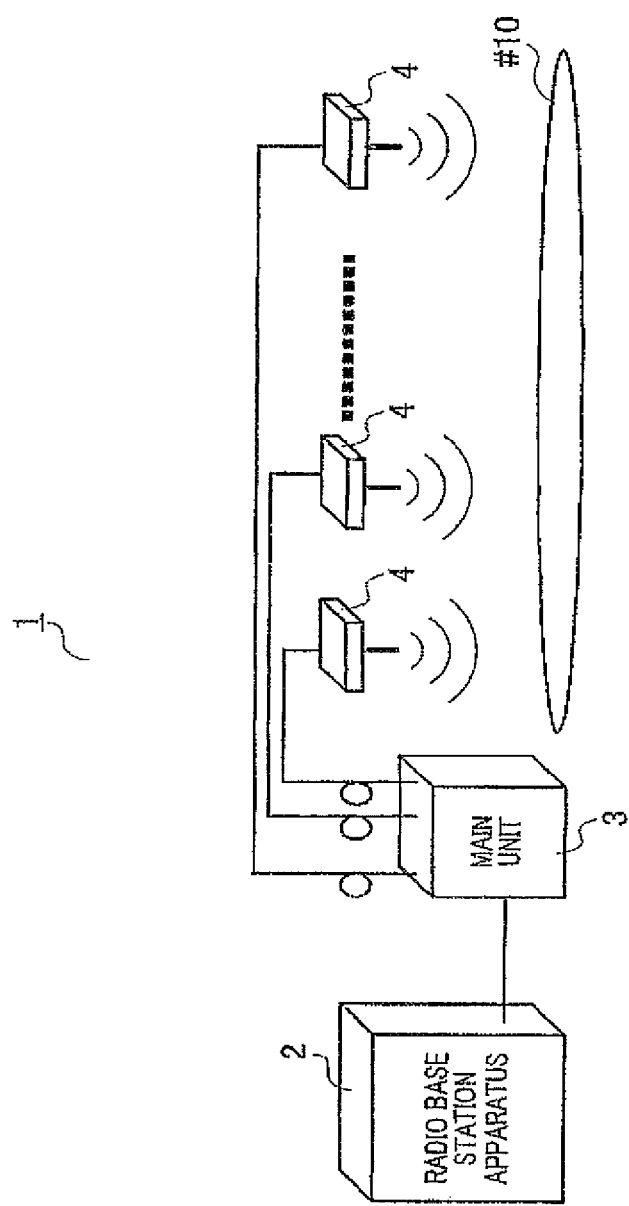
FIG. 1 is a diagram showing a configuration of a conventional communication system.
Figure 2:
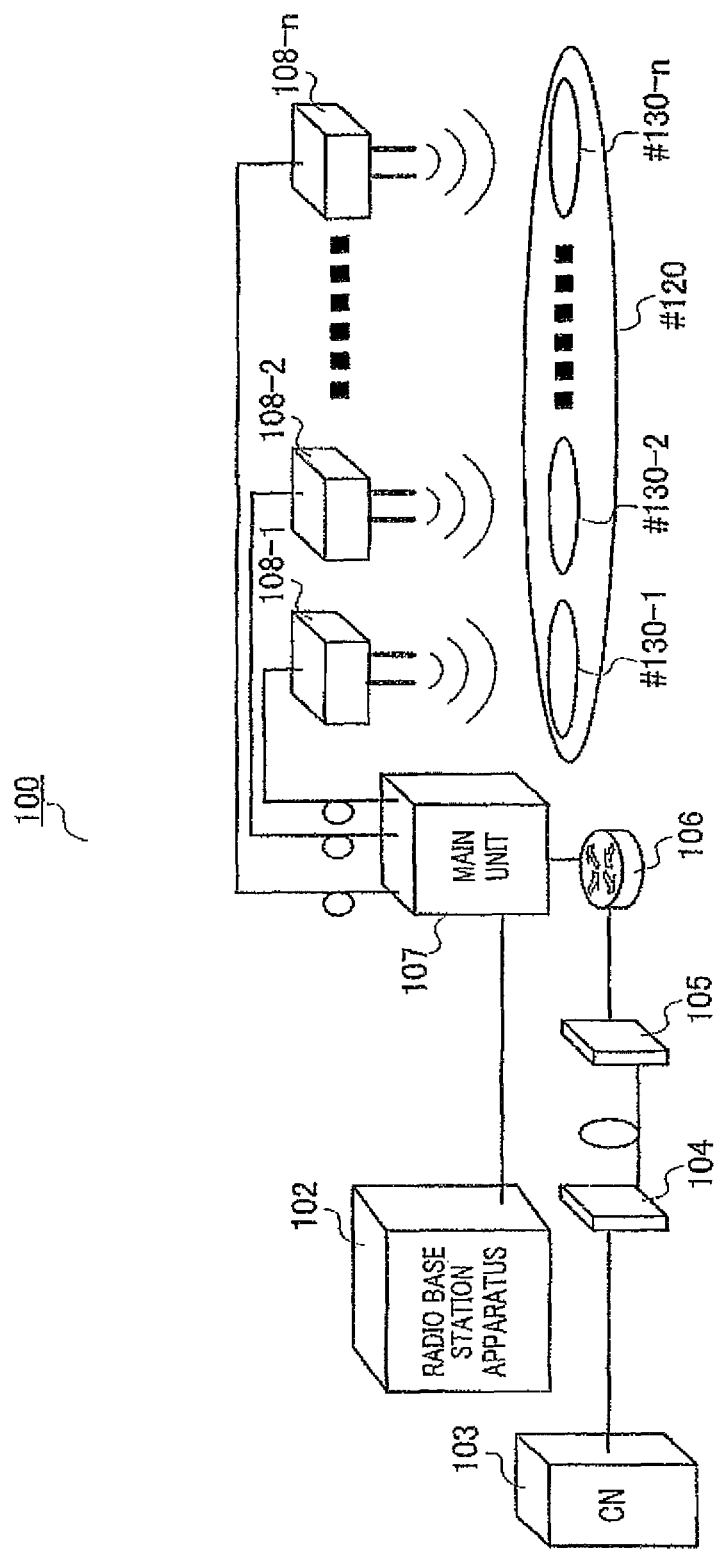
FIG. 2 is a diagram showing a configuration of a communication system according to Embodiment 1 of the present invention.

FIG. 2 is a diagram showing a configuration of communication system 100 according to Embodiment 1 of the present invention.

Communication system 100 is mainly formed of radio base station apparatus 102, core network (CN) 103, termination unit (OLT) 104, termination unit (ONU) 105, router 106, main unit 107, and a plurality of radio access units 108-1 to (n is any natural number equal to or greater than 2)

Radio base station apparatus 102 and main unit 107 are connected via one electrical signal transmission cable such as a coaxial cable. Main unit 107 and each of radio access units 108-1 to 108-n are star-connected via one optical signal transmission cable such as an optical fiber. Each component will be described below.

In the present embodiment, an example case of employing WCDMA (Wideband Code Division Multiple Access) for the first communication system and LTE (Long Term Evolution) for the second communication system will be described. The WCDMA-based first communication system and the LTE-based second communication system transmit and receive different contents of data. The present embodiment will be described assuming that signals transmitted from radio base station apparatus 102 and core network 103 to radio access units 108-1 to 108-n are downlink signals, and signals transmitted from radio access units 108-1 to 108-n to radio base station apparatus 102 and core network 103 are uplink signals.

Radio base station apparatus 102 is a radio base station for use in WCDMA, and outputs WCDMA downlink signals, which are RF signals, to main unit 107. Radio base station apparatus 102 also receives WCDMA uplink signals, which are RF signals, from main unit 107.

Core network 103 generates LTE IP signals (hereinafter, referred to as "IP signals") in accordance with an IP protocol using user data and control signals for the second communication system of the LTE scheme and outputs the generated LTE IP signals to termination unit 104. Core network 103 also receives IP signals from termination unit 104.

Termination unit 104 electroptically converts the IP signals received from core network 103, and outputs the converted signals to termination unit 105. Termination unit 104 optoelectrically converts the IP signals received from termination unit 105 and outputs the converted signals to core network 103.

Termination unit 105 optoelectrically converts the IP signals received from termination unit 104 and outputs the converted signals to router 106. Termination unit 105 electrooptically converts IP signals received from router 106 and outputs the converted signals to termination unit 104.

Router 106 relays IP signal transmission from termination unit 105 to main unit 107, or from main unit 107 to termination unit 105.

Main unit 107 splits the WCDMA downlink signal received from radio base station apparatus 102 into a plurality of WCDMA downlink signals and electrooptically converts the split WCDMA downlink signals. Main unit 107 performs wavelength division multiplexing (WDM) on WCDMA downlink signals converted into optical signals and IP signals received from router 106 and outputs the signals to radio access units 108-1 to 108-n. Main unit 107 also demultiplexes wavelength-division-multiplexed signals received from radio access units 108-1 to 108-n, into WCDMA uplink signals and IP signals, and optoelectrically converts the demultiplexed. WCDMA uplink signals and IP signals. Main unit 107 synthesizes the WCDMA uplink signals which are converted into electrical signals and outputs the signals to radio base station apparatus 102. In addition, main unit 107 outputs the IP signals converted into electrical signals to router 106. Note that the detailed configuration of main unit 107 will be described later.

A plurality of radio access units 108-1 to 108-n define single cell #120. The plurality of radio access units 108-1 to 108-n respectively define multiple cells #130-1 to #130-n in single cell #120. That is to say, the plurality of radio access units 108-1 to 108-n define the number of multiple cells #130-1 to #130-n which is the same as the number of radio access units 108-1 to 108-n. The plurality of radio access units 108-1 to 108-n demultiplex multiplexed signals received from main unit 107 into WCDMA downlink signals and IP signals and optoelectrically convert the demultiplexed WCDMA downlink signals and IP signals. The plurality of radio access units 108-1 to 108-n transmit the WCDMA downlink signals converted into electrical signals to a terminal that uses the first communication system in single cell 120. The plurality of radio access units 108-1 to 108-n transmit IP signals converted into electrical signals to a terminal that uses the second communication system in corresponding multiple cells #130-1 to #130-n. The plurality of radio access units 108-1 to 108-n receive WCDMA uplink signals transmitted from the terminal that uses the first communication system in single cell #120 or IP signals transmitted from the terminal that uses the second communication system in multiple cells #130-1 to #130-n. The plurality of radio access units 108-1 to 108-n electrooptically convert the received WCDMA uplink signals and the IP signals, perform wavelength-division-multiplexing on the WCDMA uplink signals and the IP signals which are converted into optical signals, to generate multiplexed signals, and output the generated multiplexed signals to main unit 107. Note that the detailed configuration of radio access units 108-1 to 108-n will be described later.

Figure 3:
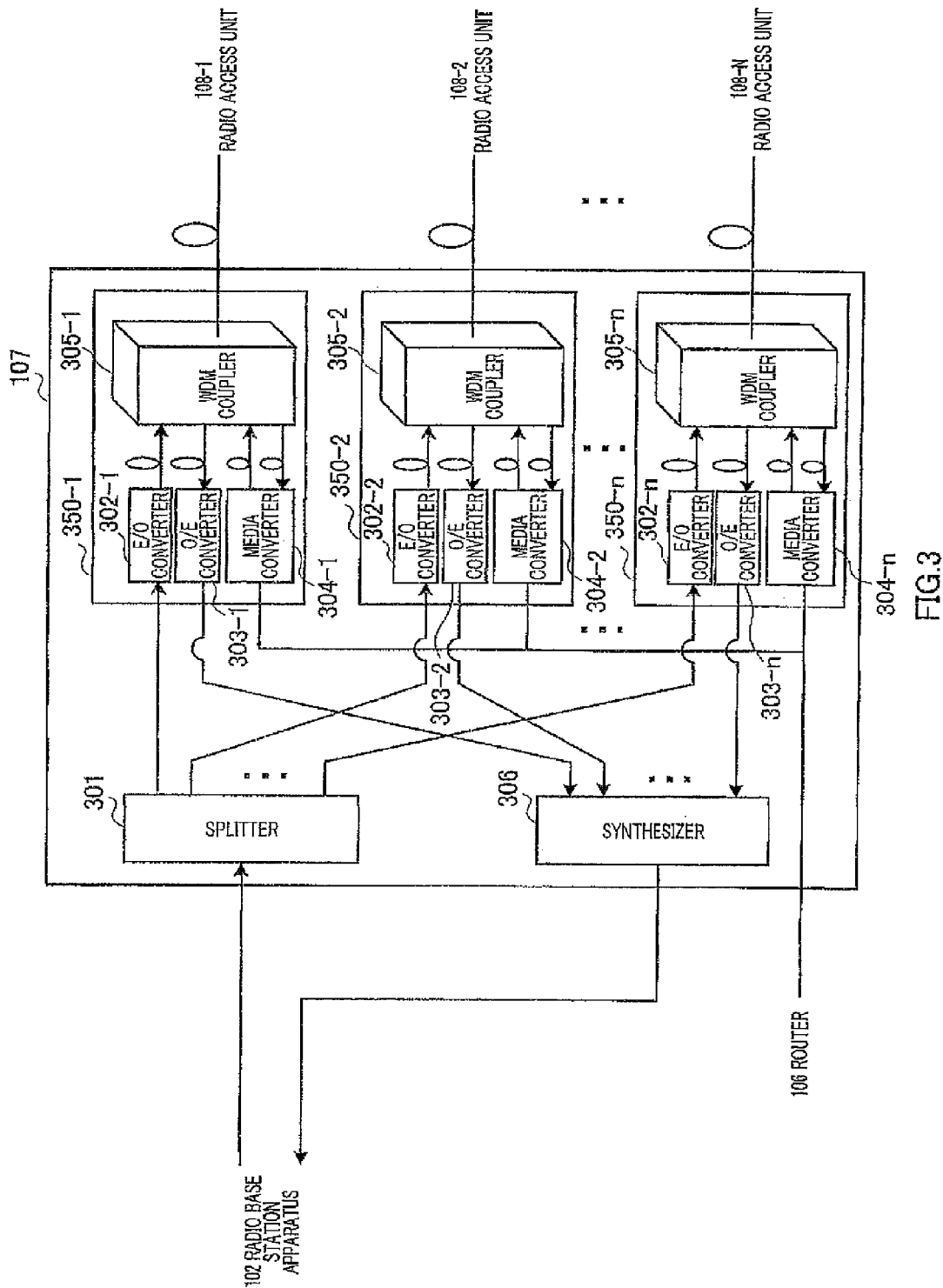
FIG. 3 is a block diagram showing a configuration of a main unit according to Embodiment 1 of the present invention.

Next, the configuration of main unit 107 will be explained using FIG. 3. FIG. 3 is a block diagram showing a configuration of main unit 107.

Main unit 107 is mainly formed of splitter 301, E/O converters 302-1 to 302-n, O/E converters 303-1 to 303-n, media converters 304-1 to 304-n, WDM couplers 305-1 to 305-n, and synthesizer 306. Optical interface sections 350-1 to 350-n include E/O converters 302-n to 302-n, O/E converters 303-1 to 303-n, media converters 304-1 to 304-n, and WDM couplers 305-1 to 305-n.

Radio base station apparatus 102 and splitter 301 are connected via one electrical signal transmission cable such as a coaxial cable. Radio base station apparatus 102 and synthesizer 306 are connected via one electrical signal transmission cable such as a coaxial cable. WDM couplers 305-1 to 305-n and radio access units 108-1 to 108-n are star-connected via optical signal transmission cables such as optical fiber cables, respectively. Each component will be described below.

Splitter 301 splits a WCDMA downlink signal received from radio base station apparatus 102 into n WCDMA downlink signals and outputs the n WCDMA downlink signals obtained by splitting to E/O converters 302-1 to 302-n, respectively.

E/O converters 302-1 to 302-n convert the WCDMA downlink signals received from splitter 301, which are electrical signals, into optical signals with wavelength $\lambda_{d\_RF}$ and output the converted signals to WDM couplers 305-1 to 305-n.

O/E converters 303-1 to 303-n convert the WCDMA uplink signals received from WDM couplers 305-1 to 305-n, which are optical signals with wavelength $d\__{RF}$, into electrical signals and output the converted signals to synthesizer 306.

Media converters 304-1 to 304-n electrooptically convert IP signals received from router 106 into optical signals with wavelength $d\__{IP}$ and output the converted signals to WDM couplers 305-1 to 305-n. Media converters 304-1 to 304-n convert the received IP signals into optical signals with different wavelengths from the optical signals converted in E/O converters 302-1 to 302-n.

WDM couplers 305-1 to 305-n perform wavelength-division-multiplexing on the WCDMA downlink signals with wavelength d_RF received from E/O converters 302-1 to 302-n and the IP signals with wavelength d_IP received from media converters 304-1 to 304-n, to generate multiplexed signals. WDM couplers 305-1 to 305-n output the generated multiplexed signals to radio access units 108-1 to 108-n, respectively. WDM couplers 305-1 to 305-n demultiplex multiplexed signals received from radio access units 108-1 to 108-n into WCDMA uplink signals with wavelength d_RF and IP signals with wavelength d_IP. WDM couplers 305-1 to 305-n output the demultiplexed WCDMA uplink signals with wavelength d_RF to O/E converters 303-1 to 303-n and output the demultiplexed IP signals with wavelength d_IP to media converters 304-1 to 304-n.

Synthesizer 306 synthesizes WCDMA uplink signals received from O/E converters 303-1 to 303-n and outputs the synthesized signal to radio base station apparatus 102.

The configuration of main unit 107 has been described above.

Figure 4:
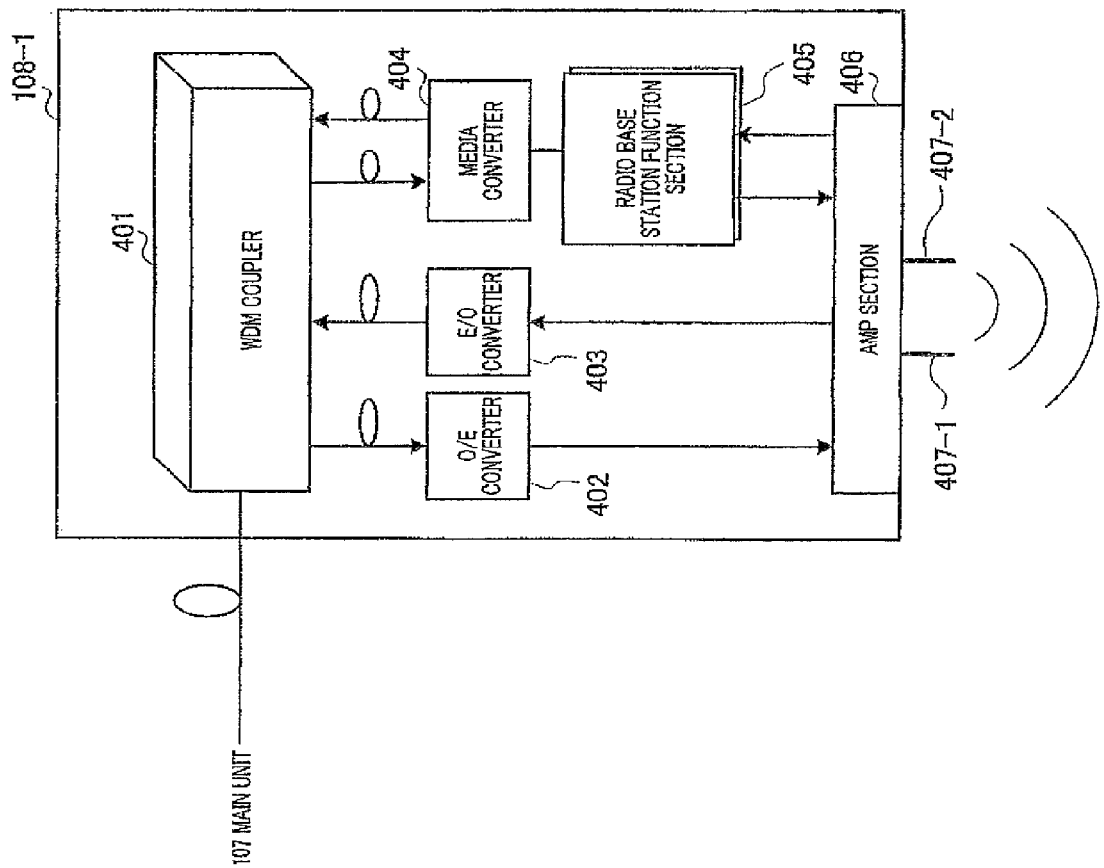
FIG. 4 is a block diagram showing a configuration of a radio access unit according to Embodiment 1 of the present invention.

Next, the configuration of radio access units 108-1 to 108-n will be described using FIG. 4. FIG. 4 is a block diagram showing the configuration of radio access unit 108-1. The configuration of radio access units 108-2 to 108-n is the same as that of radio access unit 108-1 in FIG. 4 and an explanation thereof will be omitted.

Radio access unit 108-1 is mainly formed of WDM coupler 401, O/E convertor 402, E/O converter 403, media converter 404, radio base station function section 405, AMP section 406, and antennas 407-1 and 407-2. Each component will be described below.

WDM coupler 401 demultiplexes a signal received from main unit 107 into a WCDMA downlink signal with wavelength d_RF and an IP signal with wavelength d_IP. WDM coupler 401 outputs the demultiplexed WCDMA downlink signal with wavelength d_RF to O/E converter 402 and outputs the demultiplexed IP signal with wavelength d_IP to media converter 404. WDM coupler 401 performs wavelength-division-multiplexing on a WCDMA uplink signal with wavelength d_RF received from E/O converter 403 and an IP signal with wavelength d_IP received from media converter 404, to generate a multiplexed signal. WDM coupler 401 outputs the generated multiplexed signal to main unit 107.

O/E converter 402 optoelectrically converts the WCDMA downlink signal with wavelength d_RF received from WDM coupler 401 and outputs the converted signal to AMP section 406.

E/O converter 403 converts a WCDMA uplink signal received from AMP section 406 from an electrical signal to an optical signal with wavelength d_RF and outputs the converted signal to WDM coupler 401.

Media converter 404 optoelectrically converts an IP signal with wavelength d_IP received from WDM coupler 401 and outputs the converted signal to radio base station function section 405. Media converter 404 converts an IP signal received from radio base station function section 405 from an electrical signal to an optical signal with wavelength d_IP and outputs the converted signal to WDM coupler 401. Media converter 404 converts the received IP signal into an optical signal with a different wavelength from the optical signal converted in E/O converter 403.

Radio base station function section 405 performs wired protocol signal processing and then wireless protocol signal processing corresponding to LTE on the IP signal received from media converter 404, and outputs the resultant signal to AMP section 406 as an RF downlink signal of LTE. Radio base station function section 405 performs wireless protocol signal processing and then wired protocol signal processing corresponding to LTE on the RF uplink signal of LTE received from AMP section 406, and outputs the resultant signal to media converter 404 as an IP signal of LTE. Radio base station function section 405, for example, outputs the IP signal of LTE to media converter 404 as an S1 interface signal. Radio base station function section 405 outputs a WCDMA uplink signal as an Iuh interface signal. Radio base station function section 405 has the same function as, for example, a femto cell base station. Here, a femto cell is a base station and defines a coverage area for mobile phones, which has a very small range with a radius of approximately several tens of meters.

AMP section 406 amplifies the WCDMA downlink signal received from O/E converter 402 and transmits, by radio, the amplified signal from antenna 407-1 to a terminal that uses the first communication system of single cell #120. AMP section 406 amplifies the RF downlink signal of LTE received from radio base station function section 405 and transmits the amplified signal from antenna 407-2 to a terminal that uses the second communication system in corresponding multiple cell #130-1. AMP section 406 amplifies a received signal from a terminal that uses the first communication system of single cell #120 or a terminal that uses the second communication system of multiple cell #130-1 via antenna 407-1 or 407-2, and performs filter processing on the signals, as necessary. That is to say, AMP section 406 extracts a signal in a frequency band used for WCDMA uplink signals or a signal in a frequency band used for RF uplink signals of LTE. AMP section 406 outputs the extracted WCDMA uplink signal to E/O converter 403. AMP section 406 outputs the extracted RP uplink signal of LTE to radio base station function section 405. Antennas 407-1 and 407-2 may be separately used for WCDMA and LTE, or may be shared between WCDMA and LTE.

The configuration of radio access unit 108-1 and the configuration of communication system 100 have been described above.

Next, a communication method in communication system 100 will be described. A communication method for downlink signals will be first described.

Radio base station apparatus 102 outputs a WCDMA downlink signal to main unit 107 as an RP signal.

Next, main unit 107 splits the WCDMA downlink signal received from radio base station apparatus 102 into the same number of WCDMA downlink signals as the number of radio access units 108-1 to 108-n.

Next, main unit 107 electrooptically converts the WCDMA downlink signals obtained by splitting, and IP signals received via core network 103, termination unit 104, termination unit 105, and router 106.

Main unit 107 performs wavelength-division-multiplexing on the WCDMA downlink signals and the IP signals which are converted into optical signals, to generate multiplexed signals, and outputs the generated multiplexed signals to radio access units 108-1 to 108-n.

Radio access units 108-1 to 108-n demultiplex the multiplexed signals received from main unit 107 into WCDMA downlink signals and IP signals, and optoelectrically converts the demultiplexed WCDMA downlink signals and IP signals.

Radio access units 108-1 to 108-n perform wired protocol signal processing and then wireless protocol signal processing corresponding to LTE on the IP signals converted into electrical signals, and transmit, by radio, the resultant signal to a terminal in multiple cells #130-1 to #130-n as RF downlink signals of LTE.

Radio access units 108-1 to 108-n transmit WCDMA downlink signals converted into electrical signals to a terminal that uses the first communication system in single cell #120.

The communication method for downlink signals has been described above.

A communication method for uplink signals will be described next.

Radio access units 108-1 to 108-n receive WCDMA uplink signals front a terminal that uses the first communication system in single cell #120 and receives RF uplink signals of LTE from a terminal that uses the second communication system in multiple cells #130-1 to #130-n.

Next, radio access units 108-1 to 108-n perform wireless protocol signal processing and wired protocol signal processing corresponding to LTE on the received RF uplink signal of LTE to generate IP signals of LTE.

Radio access units 108-1 to 108-n electrooptically convert the generated IP signals and the received WCDMA uplink signal.

Radio access units 108-1 to 108-n then perform wavelength-division-multiplexing on the WCDMA uplink signals and the IP signals which are converted into optical signals, to generate multiplexed signals, and outputs the generated multiplexed signals to main unit 107.

Main unit 107 demultiplexes the multiplexed signals received from radio access units 108-1 to 108-n into WCDMA uplink signals and IP signals.

Main unit 107 optoelectrically converts the demultiplexed WCDMA uplink signals and IP signals.

Main unit 107 then synthesizes the WCDMA uplink signals converted into electrical signals and outputs the synthesized signal to radio base station apparatus 102.

In addition, main unit 107 outputs the IP signals converted into electrical signals to core network 103 via router 106, termination unit 105, and termination unit 104.

The present embodiment provides each radio access unit with a radio base station function section that transmits and receives LTE IP signals by radio, and thereby eliminates the necessity to significantly change an existing system configuration, and also makes it possible to flexibly correspond to a change in a system. This can reduce cost entailed in introduction of the system. According to the present embodiment, it is possible to secure a wide coverage by defining a single cell using a plurality of radio access units. According to the present embodiment, it is possible to improve the user throughput by defining multiple cells by a plurality of radio access units, respectively. According to the present embodiment, it is possible to efficiency transmit WCDMA signals and LTE signals by performing wavelength-division-multiplexing on the WCDMA signals and LTE signals and transmitting the signals between a main unit and each radio access unit.

Embodiment 2

Figure 5:
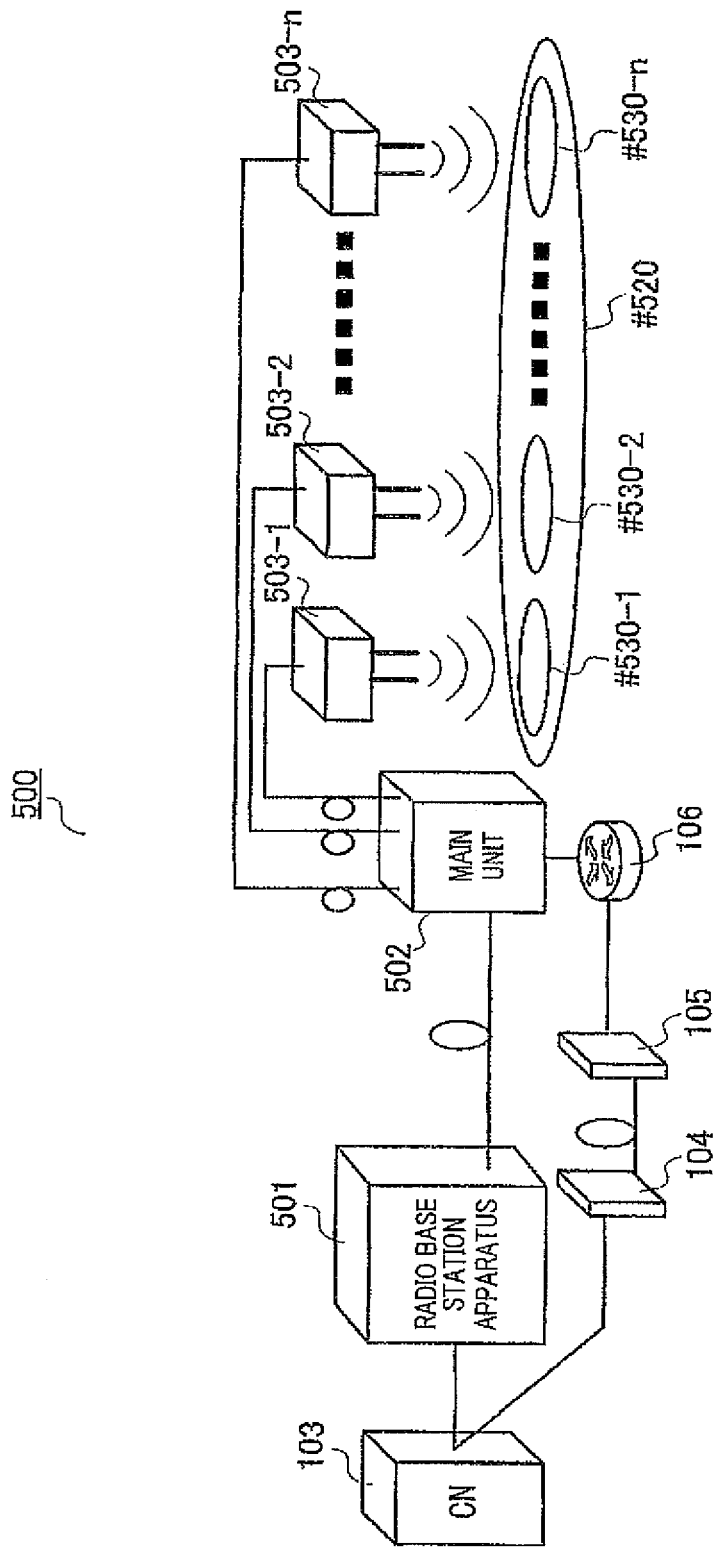
FIG. 5 is a diagram showing a configuration of a communication system according to Embodiment 2 of the present invention.

FIG. 5 is a diagram showing a configuration of communication system 500 according to Embodiment 2 of the present invention.

Communication system 500 shown in FIG. 5 includes radio base station apparatus 501 instead of radio base station apparatus 102, main unit 502 instead of main unit 107, and radio access units 503-1 to 503-n instead of radio access units 108-1 to 108-n, as compared to communication system 100 according to Embodiment 1 shown in FIG. 2. Parts in FIG. 5 that are identical in configuration to parts in FIG. 2 are assigned the same reference signs as in FIG. 5, and explanation thereof will be omitted here.

Communication system 500 is mainly formed of core network (CN) 103, termination unit (OLT) 104, termination unit (ONU) 105, router 106, radio base station apparatus 501, main unit 502, and a plurality of radio access units 503-1 to 503-n.

Core network 103 and radio base station apparatus 501 are connected via one electrical signal transmission cable such as a coaxial cable. Radio base station apparatus 501 and main unit 502 are connected via one optical signal transmission cable such as an optical fiber cable, and using a CPRI (Common Public Radio Interface) interface. In the present embodiment, a case will be described where the signals of the first communication system and second communication system are multiplexed using a CPRI format for transmitting IQ signals for two antennas, using a single carrier frequency. In this case, a diversity scheme is not employed in transmitting CPRI signals in uplink and downlink, which are outputted between radio base station apparatus 501 and main unit 502. That is to say, IQ signals for one antenna are outputted. Main unit 502 and each of radio access units 503-1 to 503-*n* are star-connected via one optical signal transmission cable such as an optical fiber. Each component will be described below.

In the present embodiment, a case of employing LTE for the first communication system and employing LTE for the second communication system will be described as an example. The LTE-based first communication system and the LTE-based the second communication system transmit and receive different contents of data. The present embodiment will be described, assuming that signals transmitted from core network 103 to radio access units 503-1 to 503-*n* are downlink signals, and signals transmitted from radio access units 503-1 to 503-*n* to core network 103 are uplink signals.

Core network 103 outputs IP signals of LTE in the first communication system to radio base station apparatus 501 and outputs IP signals of the LTE in the second communication system to termination unit 104. Core network 103 receives IP signals of the LTE in the first communication system from radio base station apparatus 501 and receives IP signals of the LTE in the second communication system from termination unit 104.

Radio base station apparatus 501 is a radio base station for the LTE, converts IP signals received from core network 103 into CPRI downlink signals which are optical signals, performs wavelength-division-multiplexing on the converted CPRI downlink signals and CPRI uplink signals, and outputs the resultant signals to main unit 502. Radio base station apparatus 501 converts the CPRI uplink signals received from main unit 502, which are optical signals, and subjected to wavelength-division-multiplexing with CPRI downlink signals, into IP signals and outputs the converted signals to core network 103.

Router 106 relays IP signal transmission from termination unit 105 to main unit 502, or IP signal transmission from main unit 502 to termination unit 105.

Main unit 502 demultiplexs CPRI downlink signals received from radio base station apparatus 501, from CPRI signals. Main unit 502 optoelectrically converts the demultiplexed CPRI downlink signals and branches the CPRI downlink signals converted into electrical signals per frame. Main unit 502 multiplexes the branched CPRI downlink signals with IP signals received from router 106 per frame to generate downlink multiplexed signals, and electrooptically converts the generated downlink multiplexed signals. Main unit 502 performs wavelength-division-multiplexing on the downlink multiplexed signals converted into optical signals with uplink multiplexed signals and outputs the resultant signals to radio access units 503-1 to 503-*n*. Main unit 502 demultiplexes uplink multiplexed signals received from radio access units 503-1 to 503-*n* from downlink multiplexed signals and demultiplexes the demultiplexed uplink multiplexed signals per frame. Main unit 502 adds the uplink multiplexed signals which are demultiplexed per frame to generate CPRI uplink signals, and electrooptically converts the generated CPRI uplink signals. Main unit 502 performs wavelength-division-multiplexing on the CPRI uplink signals converted into optical signals and CPRI downlink signals, and outputs the resultant signals to radio base station apparatus 501. Note that the detailed configuration of main unit 502 will be described later.

A plurality of radio access units 503-1 to 503-*n* define single cell #520. The plurality of radio access units 503-1 to 503-*n* respectively define multiple cells #530-1 to #530-*n* in single cell #520. That is to say, the plurality of radio access units 503-1 to 503-*n* define the same number of multiple cells #530-1 to #530-*n* as the number of radio access units 503-1 to 503-*n*. The plurality of radio access units 503-1 to 503-*n* demultiplex downlink multiplexed signals received from main unit 502, from uplink multiplexed signals, and optoelectrically convert the demultiplexed downlink multiplexed signals. The plurality of radio access units 503-1 to 503-*n* demultiplex the downlink multiplexed signals converted into electrical signals, per frame and upconvert the demultiplexed downlink multiplexed signals to generate RF signals having a radio frequency in which a terminal that uses the first communication system single cell #520 can receive. The plurality of radio access units 503-1 to 503-*n* transmit, by radio, the RF signals to the terminal that uses the first communication system in single cell #520. The plurality of radio access units 503-1 to 503-*n* convert the demultiplexed downlink multiplexed signals into IP signals and transmit the converted IP signals to a terminal that uses the second communication system in corresponding multiple cells #530-4 to #530-*n*. The plurality of radio access units 503-1 to 503-*n* receive RP signals transmitted from the terminal that uses the first communication system in single cell #520 or RF signals received from the terminal that uses the second communication system in multiple cells #530-1 to #530-*n*. The plurality of radio access units 503-1 to 503-*n* downconvert RF signals received from the terminal that uses the first communication system in single cell #520. The plurality of radio access units 503-1 to 503-*n* perform wireless protocol signal processing and then wired protocol signal processing on the RF signals received from the terminal that uses the second communication system in multiple cells #530-1 to #530-*n*, to generate IP signals. The plurality of radio access units 503-1 to 503-*n* multiplex the generated IP signals and the downconverted signals received from the terminal that uses the first communication system in single cell #520, per frame, to generate uplink multiplexed signals, and electrooptically convert the generated uplink multiplexed signals. The plurality of radio access units 503-1 to 503-*n* electrooptically convert the uplink multiplexed signals converted into optical signals, perform wavelength-division-multiplexing on the uplink multiplexed signals converted into optical signals with downlink multiplexed signals, and output the resultant signals to main unit 502. Note that the detailed configuration of radio access units 503-1 to 503-*n* will be described later.

Figure 6:
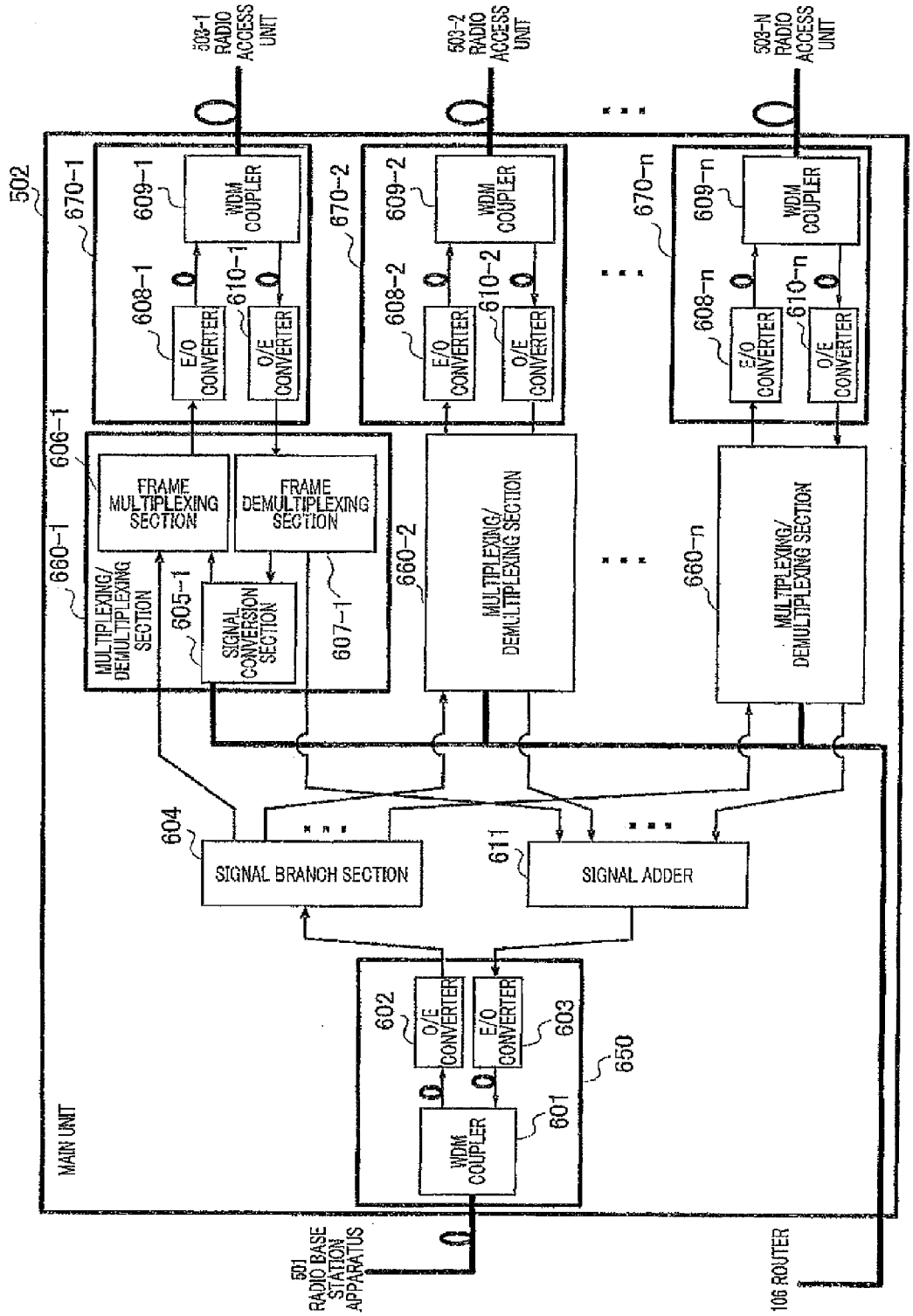
FIG. 6 is a block diagram showing a configuration of a main unit according to Embodiment 2 of the present invention.

Next, the configuration of main unit 502 will, be described using FIG. 6. FIG. 6 is a block diagram showing the configuration of main unit 502.

Main unit 502 is mainly formed of WDM coupler 601, O/E converter 602, E/O converter 603, signal branch section 604, signal conversion sections 605-1 to 605-*n*, frame multiplexing sections 606-1 to 606-*n* frame demultiplexing sections 607-1 to 607-*n*, E/O converters 608-1 to 608-*n*, WDM couplers 609-1 to 609-*n*, O/E converters 610-1 to 610-*n*, and signal adder 611 REC interface section 650 includes WDM coupler 601, WE converter 602, and E/O converter 603. Multiplexing/demultiplexing sections 660-1 to 660-*n* include signal conversion sections 605-1 to 605-*n*, frame multiplexing sections 606-1 to 606-*n*, and frame demultiplexing sections 607-1 to 607-*n*, respectively. Radio access unit interface sections 670-1 to 670-*n* include E/O converters 608-1 to 608-*n*, WDM couplers 609-1 to 609-*n*, and O/E converters 610-1 to 610-*n*, respectively REC refers to an apparatus having a function to perform modulation and demodulation for a radio base station apparatus defined by the specification of CPRI. Each component will be described below.

WDM coupler 601 demultiplexes CPRI downlink signals, from multiplexed signals obtained by wavelength-division-multiplexing of CPRI downlink signals received from radio base station apparatus 501 and CPRI uplink signals. WDM coupler 601 outputs the demultiplexed CPRI downlink signals to O/E converter 602. WDM coupler 601 performs wavelength-division-multiplexing on the CPRI uplink signals received from E/O converter 603 and CPRI downlink signals, to generate multiplexed signals, and outputs the generated multiplexed signals to radio base station apparatus 501.

O/E converter 602 optoelectrically converts the CPRI downlink signals received from WDM coupler 601 and outputs the converted signals to signal branch section 604.

E/O converter 603 electrooptically converts the CPRI uplink signals received from signal adder 611 and outputs the converted signals to WDM coupler 601.

Signal branch section 604 branches the CPRI downlink signals received from O/E converter 602 into n CPRI downlink signals and respectively outputs the branched CPRI downlink signals to frame multiplexing sections 606-1 to 606-n.

Signal conversion sections 605-1 to 605-n convert the IP signals received train router 106 into pseudo 1Q signals and outputs the converted signals to frame multiplexing sections 606-1 to 606-n, respectively. Here, the pseudo IQ signals are continuous signals obtained by inserting a dummy bit into the IP signals received from router 106 such that the signal speed of the IP signals is equivalent to that of IQ signals transmitted and received in an CPRI interface between radio base station apparatus 501 and REC interface section 650. Signal conversion sections 605-1 to 605-n remove a dummy bit from pseudo IQ signals received from frame demultiplexing sections 607-1 to 607-n to convert the received pseudo IQ signals into IP signals and output the converted signals to router 106.

Frame multiplexing sections 606-1 to 606-n multiplex the CPRI downlink signals received from signal branch section 604 with the pseudo 1Q signals received from signal conversion sections 605-1 to 605-n per frame to generate CPRI frame downlink signals. CPRI frame downlink signals are multiplexed in accordance with a CPRI format. Frame multiplexing sections 606-1 to 606-n output the generated CPRI frame downlink signals to E/O converters 608-1 to 608-n. Frame multiplexing sections 606-1 to 606-n treat the received CPRI downlink signals and the pseudo IQ signals as signals of different antennas in the CPRI interface. A process in signal conversion sections 605-1 to 605-n will be described later.

Frame demultiplexing sections 607-1 to 607-n demultiplex CPRI frame uplink signals received from O/E converters 610-1 to 610-n into IQ signals and pseudo IQ signals which are signals of different antennas in the CPRI interface. Frame demultiplexing sections 607-1 to 607-n output the demultiplexed IQ signals to signal adder 611 and output the demultiplexed pseudo IQ signals to signal conversion sections 605-1 to 605-n.

E/O converters 608-1 to 608-n electrooptically convert the CPRI frame downlink signals received from frame multiplexing sections 606-1 to 606-n and output the converted signals to WDM couplers 609-1 to 609-n, respectively.

WDM couplers 609-1 to 609-n perform wavelength-division-multiplexing on the CPRI frame downlink signals received from E/O converters 608-1 to 608-n with CPRI frame uplink signals and output the resultant signals to radio access units 503-1 to 503-n. WDM couplers 609-1 to 609-n demultiplex CPRI frame uplink signals from multiplexed signals obtained by wavelength-division-multiplexing CPRI frame downlink signals and CPRI frame uplink signals, and output the demultiplexed CPRI frame uplink signals to WE converters 610-1 to 610-n.

O/E converters 610-1 to 610-n optoelectrically convert the CPRI frame uplink signals received from WDM couplers 609-1 to 609-n and output the converted signals to frame demultiplexing sections 607-1 to 607-n, respectively.

Signal adder 611 adds n IQ signals received from frame detmultiplexing sections 607-1 to 607-n to generate a CPRI uplink signal. Signal adder 611 outputs the generated CPRI uplink signal to E/O converter 603.

The configuration of main unit 502 has been described above.

Figure 7:
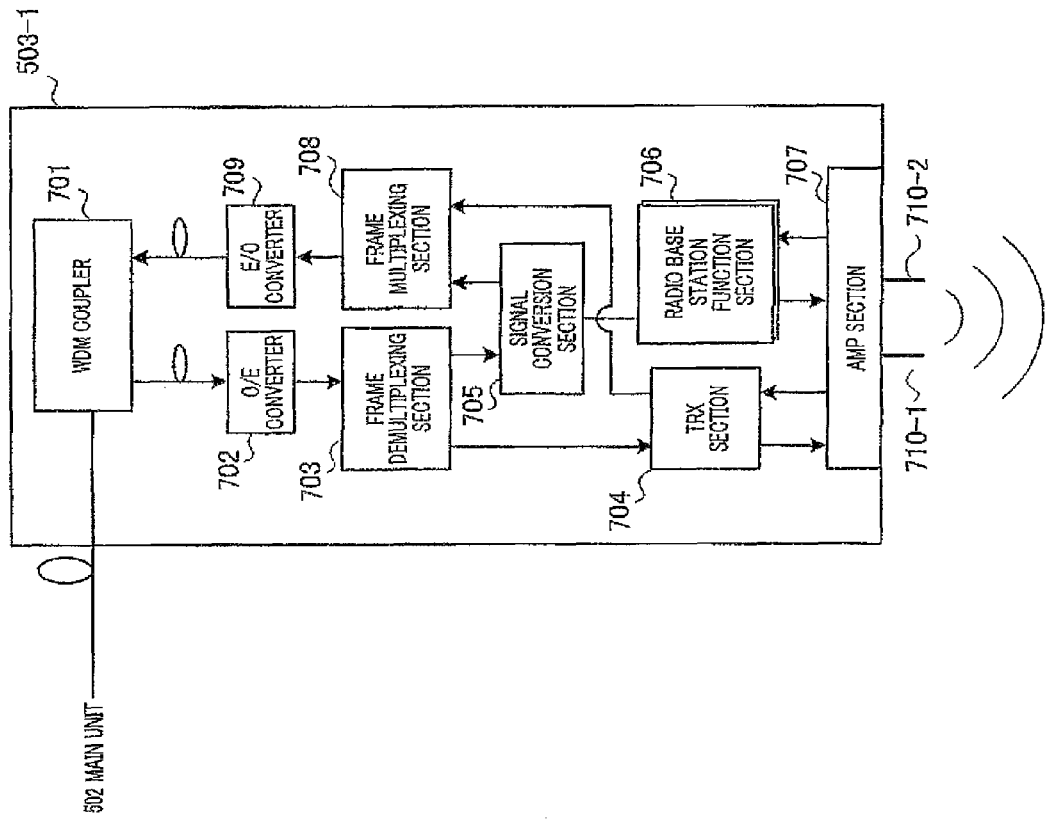
FIG. 7 is a block diagram showing a configuration of a radio access unit according to Embodiment 2 of the present invention.

Next, the configuration of radio access units 503-1 to 503-n will be described using FIG. 7. FIG. 7 is a block diagram showing the configuration of radio access unit 503-1. The configuration of radio access units 503-2 to 503-n is the same as that of radio access unit 503-1 in FIG. 7 and an explanation thereof will be omitted.

Radio access unit 503-1 is mainly formed of WDM coupler 701, O/E converter 702, frame demultiplexing section 703, TRX section 704, signal conversion section 705, radio base station function section 706, AMP section 707, frame multiplexing section 708, E/O converter 709 and antennas 710-1 and 710-2. Each component will be described below.

WDM coupler 701 demultiplexes CPRI frame downlink signals, from multiplexed signals obtained by wavelength-division-multiplexing of CPRI frame downlink signals received from main unit 502 and CPRI frame uplink signals. WDM coupler 701 outputs the demultiplexed CPRI frame downlink signals to O/E converter 702. WDM coupler 701 performs wavelength-division-multiplexing on. CPRI frame uplink signals received from E/O converter 709 and CPRI frame downlink signals and outputs the resultant signals to main unit 502.

O/E converter 702 optoelectrically converts the CPRI frame downlink signals received from WDM coupler 701 and outputs the converted signals to frame demultiplexing section 703.

Frame demultiplexing section 703 demultiplexes the CPRI frame downlink signals received from O/E converter 702 into IQ signals and pseudo IQ signals which are signals of different antennas in the CPRI interface. Frame demultiplexing section 703 outputs the demultiplexed IQ signals to TRX section 704 and outputs the demultiplexed pseudo IQ signals to signal conversion sections 705.

TRX section 704 upconverts the IQ signals received from frame demultiplexing section 703, to generate RF signals having a predetermined radio frequency and outputs the upconverted signals to AMP section 707. TRX section 704 downconverts RF signals received from AMP section 707, to generate IQ signals and outputs the generated IQ signals to frame multiplexing section 708.

Signal conversion section 705 converts the pseudo IQ signals received from frame demultiplexing section 703 into IP signals by removing a dummy bit from the pseudo IQ signals, and outputs the converted IP signals to radio base station function section 706. Signal conversion section 705 inserts a dummy bit into the IP signals received from radio base station function section 706, to generate pseudo IQ signals and outputs the generated pseudo IQ signals to frame multiplexing section 708.

Radio base station function section 706 performs wired protocol signal processing and then performs wireless protocol signal processing corresponding to LTE, on the IP signals received from signal conversion section 705 and outputs the resultant signals to AMP section 707 as RF downlink signals of LTE Radio base station function section 706 performs wireless protocol signal processing and then wired protocol signal processing corresponding to LTE, on RF uplink signals of the LTE received from AMP section 707 and outputs the resultant signals to signal conversion section 705 as IP signals of the LTE. Radio base station function section 706, for example, outputs the IP signals of LTE to signal conversion section 705 as an S1 interface signal. Radio base station function section 706 outputs a WCDMA uplink signal as an Iuh interface signal. Radio base station function section 706 has the same function as, for example, a femto cell base station.

AMP section 707 amplifies the RF signals received from TRX section 704 and transmits the amplified signals from antenna 710-1 to a terminal that uses the first communication system by radio AMP section 707 amplifies the RF signals received from radio base station function section 706 and transmits the amplified signals from antenna 710-2 to a terminal that uses the second communication system in corresponding multi cell #530-1. AMP section 707 amplifies received signals from the terminal that uses the first communication system in single cell #520 or the terminal that uses the second communication system in multi cell #530-1 via antennas 710-1 and 710-2, and performs filter processing on the signals, as necessary. That is to say, AMP section 707 extracts signals in a frequency band used for the LTE in single cell #520 and signals in a frequency band used for the LTE in multi cell #530-1. AMP section 707 outputs the extracted RF signals of the LTE in single cell #520 to TRX section 704. AMP section 707 outputs the extracted RF signals of the LTE in multi cell #530-1 to radio base station function section 706. Antennas 710-1 and 710-2 may be separately used for each LTE or may be shared with each LTE.

Frame multiplexing section 708 multiplexes the IQ signals received from TRX section 704 with the pseudo IQ signals received from signal conversion section 705 per frame and generates CPRI frame uplink signals. CPRI frame uplink signals are multiplexed in accordance with a CPRI format. Frame multiplexing section 708 outputs the generated CPRI uplink signals to E/O converter 709.

E/O converter 709 electrooptically converts the CPRI frame uplink signals received from frame multiplexing section 708 and outputs the converted signals to WDM coupler 701.

The configuration of radio access unit 503-1 and the configuration of communication system 100 have been described above.

Next, a communication method in communication system 500 will be described. A communication method for downlink signals will be first described.

Radio base station apparatus 501 electrooptically converts CPRI downlink signals acquired from core network 103, performs wavelength-division-multiplexing on the CPRI downlink signals converted into optical signals and CPRI uplink signals, to generate multiplexed signals.

Radio base station apparatus 501 outputs the generated multiplexed signals to main unit 502.

Main unit 502 demultiplexes the CPRI downlink signals from the multiplexed signals received from radio base station apparatus 501 and optoelectrically converts the demultiplexed CPRI downlink signals.

Next, main unit 502 branches the CPRI downlink signal converted into an electrical signal into n CPRI downlink signals.

Main unit 502 converts IP signals received from router 106 into pseudo IQ signals.

Main unit 502 multiplexes the n CPRI downlink signals and the pseudo IQ signals per frame to generate n CPRI frame downlink signals and electrooptically converts the generated CPRI frame downlink signals.

Main unit 502 performs wavelength-division-multiplexing on the CPRI downlink signals converted into optical signals and CPRI uplink signals to generate n multiplexed signals, and output the n generated multiplexed signals to radio access units 503-1 to 503-n respectively.

Next, radio access units 503-1 to 503-n demultiplex CPRI downlink signals from the multiplexed signals received from main unit 502.

Next, radio access units 503-1 to 503-n optoelectrically convert the demultiplexed CPRI downlink signals and demultiplex the CPRI downlink signals converted into electrical signals, into IQ signals and pseudo IQ signals.

Radio access units 503-1 to 503-n upconvert the IQ signal to generate RF signals and transmits, by radio, the generated RF signals to a terminal that uses the first communication system in single cell #520.

Radio access units 503-1 to 503-n convert the pseudo IQ signals into IP signals and convert the IP signals into RF signals, and transmit, by radio, the converted signals to a terminal that uses the second communication system in corresponding multiple cells #530-1 to #530-n.

The communication method for downlink signal has been described above.

A communication method for uplink signals will be described next.

Radio access units 503-1 to 503-n receive RF signals from a terminal that uses the first communication system in single cell #520 and receive RF signals from a terminal that uses the second communication system in multiple cells #530-1 to #530-n.

Radio access units 503-1 to 503-n downconvert the RF signals received from the terminal that uses the first communication system in single cell #520, to generate IQ signals.

Radio access units 503-1 to 503-n convert the RF signals received from the terminal that uses the second communication system in multiple cells #530-1 to #530-n into IP signals and convert the IP signals into pseudo IQ signals.

Radio access units 503-1 to 503-n multiplex the IQ signals and the pseudo IQ signals per frame to generate CPRI frame uplink signals and electrooptically convert the generated. CPRI frame uplink signals.

Radio access units 503-1 to 503-n perform wavelength-division-multiplexing on the CPRI frame uplink signals converted into optical signals and CPRI frame downlink signals, to generate multiplexed signals and output the generated multiplexed signals to main unit 502.

Main unit 502 demultiplexes CPRI frame uplink signals from the multiplexed signals received from radio access units 503-1 to 503-n and optoelectrically converts the demultiplexed CPRI frame uplink signals.

Main unit 502 demultiplexes the CPRI frame uplink signals converted into electrical signals, into IQ signals and pseudo IQ signals.

Main unit 502 converts the demultiplexed pseudo IQ signals into IP signals and outputs the IP signals to router 106.

Main unit 502 adds n demultiplexed IQ signals to generate uplink CPRI signals and electrooptically converts the generated uplink CPRI signals.

Main unit 502 performs wavelength-division-multiplexing on the uplink CPRI signals converted into optical signals and downlink CPRI signals to generate multiplexed signals and outputs the generated multiplexed signals to radio base station apparatus 501.

The communication method in communication system 500 has been described above.

Figure 8:
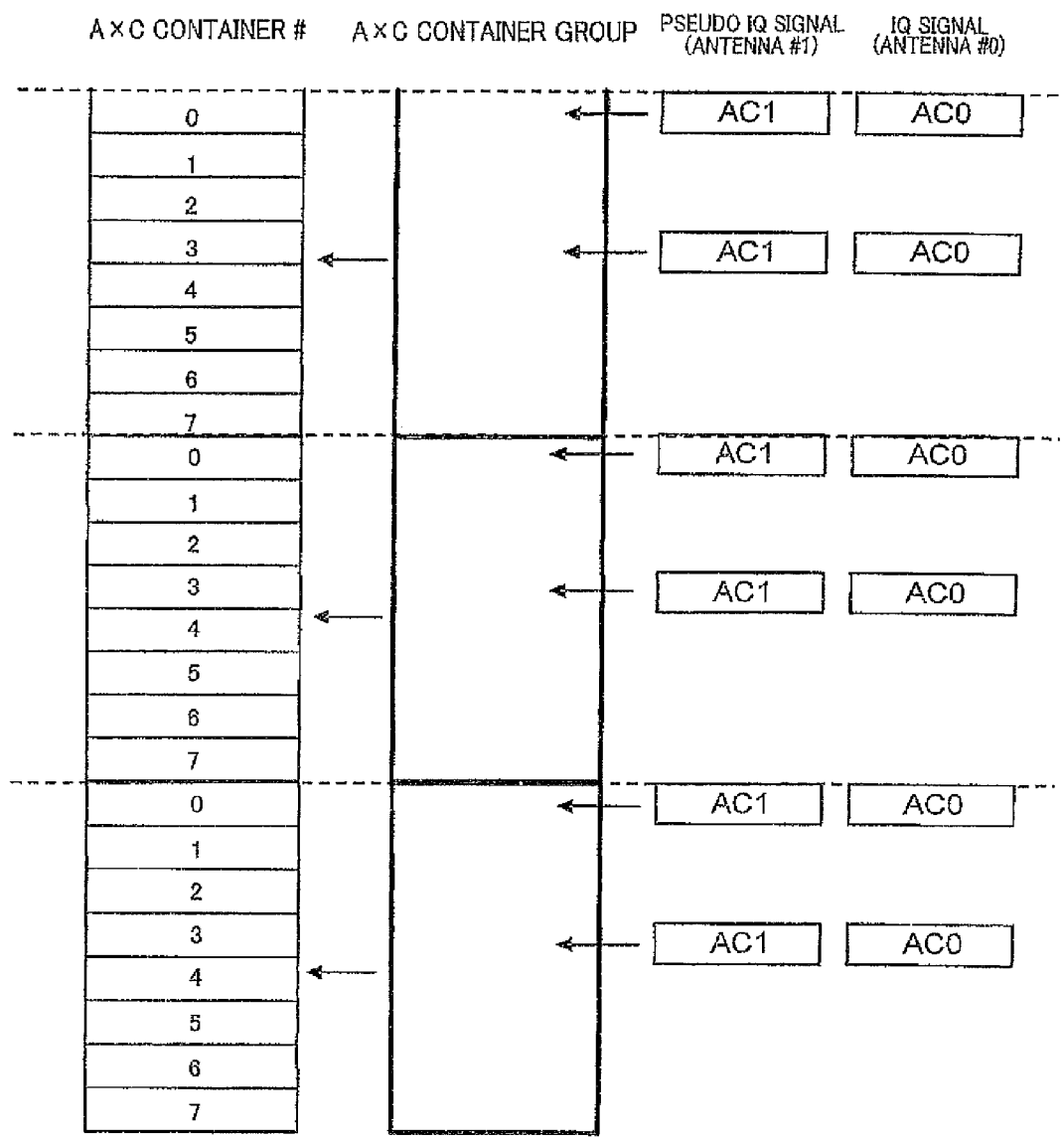
FIG. 8 is a diagram showing a multiplexing processing. Method of CPRI frames according to Embodiment 2 of the present invention.

A process in frame multiplexing sections 606-1 to 606-n and frame multiplexing section 708 will be described using FIG. 8. FIG. 8 is a diagram showing a process of multiplexing in a CPRI frame.

Frame multiplexing sections 606-1 to 606-n and frame multiplexing section 708 treat IQ signals as signals of antenna #0 (AC0) and treat pseudo IQ signals as signals of antenna #1 (AC1) as shown in FIG. 8. Frame multiplexing sections 606-1 to 606-n and frame multiplexing section 708 generate CPRI frame downlink signals and CPRI frame uplink signals, using AxC containers #0 to #7 as one group. In this embodiment, a CPRI format for transmitting IQ signals for two antennas, using a single carrier frequency, as an example. The present embodiment uses signals assigned to one of two antennas for radio signals to be transmitted to a terminal that uses the first communication system in a single cell. The present embodiment uses signals assigned to the other antenna for IP signals transmitted to a terminal that uses the second communication system in multiple cells.

In view of the above, the present embodiment provides each radio access unit with a radio base station function section that transmits and receives LTE IP signals by radio, and thereby eliminates the necessity to significantly change an existing system configuration and also makes it possible to flexibly correspond to a change in a system. This can reduce cost entailed in introduction of the system. According to the present embodiment, it is possible to secure a wide coverage by defining a single cell using a plurality of radio access units. According to the present embodiment, it is possible to improve a user throughput by defining multiple cells by a plurality of radio access units, respectively. According to the present embodiment, a main unit and a radio access unit perform wavelength-division-multiplexing on LTE signals in each communication system and transmit the signals, so that the LTE signals in each communication system can be efficiently transmitted.

The disclosure of Japanese Patent Application No. 2010-95184, filed on Apr. 16, 2010, including the specification, drawings and abstract, is incorporated herein by reference in its entirety.

INDUSTRIAL APPLICABILITY

A communication system, a main unit, a radio access unit, and a communication method according to the present invention is suitable for making space, for example, in buildings or underground malls usable as a coverage area, the space being an area which cannot receive any radio wave signal from a radio base station installed outdoors.

REFERENCE SIGNS LIST

100 Communication system
102 Radio base station apparatus
103 Core network
104, 105 Termination unit
106 Router
107 Main unit
108-1 to 108-n Radio access unit
120 Single cell
130-1 to #130-n Multiple cell

The invention claimed is:

1. A communication system comprising:
a base station apparatus;
a plurality of radio access units; and
a main unit configured to relay signals between the base station apparatus and the plurality of radio access units, wherein:
each of the plurality of radio access units is configured to:
define a single cell of a first communication system managed by the base station apparatus, in combination with other radio access units in the plurality of radio access units, and
define a cell of a second communication system managed by a base station function of each of the plurality of radio access units.

2. The communication system according to claim 1, wherein:
the main unit is further configured to relay signals of the second communication system between a network and the plurality of radio access units,
the main unit and each of the plurality of radio access units are configured to be connected to each other by first optical transmission channels, and
the main unit and each of the plurality of radio access units are configured to exchange a first multiplexed signal on which a signal of the first communication system and a signal of second communication system are multiplexed by wavelength-division-multiplexing, via the first optical transmission channels.

3. The communication system according to claim 1, wherein:
the main unit and the base station apparatus are configured to be connected to each other by a second optical transmission channel, and
the main unit and the base station apparatus exchange a second multiplexed signal on which an uplink signal of the first communication system and an downlink signal of the first communication system are multiplexed by wavelength-division-multiplexing, via the second optical transmission channel.

4. A main unit comprising:
a receiving section configured to receive a downlink signal of a first communication system and downlink signals of a second communication system;
a splitting section configured to split the received downlink signal of the first communication system into a plurality of downlink signals of the first communication system;
a multiplexing section configured to:
add a dummy bit to each of the received downlink signals of the second communication system, and
generate multiplexed signals, by multiplexing, per frame, each of the split downlink signals of the first communication system and each of the received downlink signals of the second communication system to which the dummy bit is added; and
a transmitting section transmit the multiplexed signals to a plurality of radio access units.

5. The main unit according to claim 4, wherein:

the multiplexing section is configured to generate the multiplexed signals, by performing wavelength-division-multiplexing, and the transmitting section is configured to transmit the multiplexed signal via an optical transmission channel.

6. A main unit comprising:

a receiving section configured to receive multiplexed signals from a plurality of radio access units;

a de-multiplexing section configured to:

de-multiplex, per frame, the received multiplexed signals to generate split uplink signals of the first communication system and uplink signals of the second communication system including a dummy bit, and remove the dummy bit from the uplink signals of the second communication system including the dummy bit;

a synthesizing section configured to synthesize the split uplink signals of the first communication system to generate an uplink signal of the first communication system; and a transmitting section configured to transmit the uplink signal to a base station which manages a single cell of the first communication system, and to transmit the signals of the second communication system without the dummy bits to a network of the second communication system.

7. The main unit according to claim 6, wherein:

the receiving section is configured to connect with the plurality of multiplexed signals via optical transmission channel, and the multiplexed signal is generated by performing wavelength-division-multiplexing at the plurality of radio access units.

8. A radio access unit comprising:

a communication section configured to exchange a signal of a first communication system and a signal of a second communication system with a main unit;

a cell defusing section configured to define a single cell of the first communication system in combination with other radio access units, the single cell being managed by a base station apparatus which generates the signal of the first communication system; and a base station function section configured to form a cell of the second communication system, and to manage the cell of the second communication system.

9. The radio access unit according to claim 8, wherein the communication section is configured to be connected with the main unit by an optical transmission channel, and to exchange a multiplexed signal on which the signal of the first communication system and the signal of the second communication system are multiplexed by wavelength-division-multiplexing, via the optical transmission channel.

10. The radio access unit according to claim 9, wherein the communication section is further configured to, when the communication section receives, from the main unit, a multiplexed signal on which a downlink signal of the first communication system and a downlink signal of the second communication system are multiplexed, de-multiplex the multiplexed signal and remove dummy bits included in a de-multiplexed downlink signal of the second communication system.

11. The radio access unit according to claim 9 wherein the communication sections is further configured to, when the communication section transmits an uplink signal of the first communication system and an uplink signal of the second communication system to the main unit, add dummy bits to the uplink signal of the second communication system and perform the wavelength-division-multiplexing on the uplink signal of the first communication system and the uplink signal of the second communication system with the dummy bits.

* * * * *